April 4, 1967 F. ZAWISTOWSKI 3,311,986
COMPENSATED GAUGES FOR EXTERNAL DIMENSIONS
Filed Aug. 7, 1964 2 Sheets-Sheet 1

INVENTOR.
FERDYNAND ZAWISTOWSKI
BY
Bierman & Bierman
ATTORNEYS

United States Patent Office 3,311,986
Patented Apr. 4, 1967

3,311,986
COMPENSATED GAUGES FOR EXTERNAL DIMENSIONS
Ferdynand Zawistowski, Haifa, Israel, assignor to Technion Research and Development Foundation Ltd., Haifa, Israel, a corporation of Israel
Filed Aug. 7, 1964, Ser. No. 388,097
12 Claims. (Cl. 33—147)

OBJECT OF INVENTION

This invention relates to a compensated gauge for external dimensions which will measure the exact external dimensions with accuracy, completely independent of the temperature in which the measurement takes place.

Prior to the invention of the gauge construction presented here, devices have been known wherein, by suitable assembly of metals of different coefficients of thermal expansion, it has been possible to build and operate the clock's pendulum of constant length independent of temperature changes occurring.

The application of the above mentioned compensation of thermal elongation makes it theoretically possible to design and to build a fully compensated rod which will keep a constant distance between its ends independently of the changes of temperature occurring.

Such a rod can be used as the main body of the *internal* micrometer but cannot be used for making an *external* micrometer for measuring external sizes, as this kind of compensation is of one dimensional nature and cannot be used in the design of a semi-circular frame which is necessary in this case.

It is the object of my invention to provide a semi-circular frame which may be used as a micrometer gauge body for measuring large dimensions and its operation will be completely independent from the temperature conditions occurring during the measurement processes.

It is the further object of my invention to provide the thermally fully compensated semi-circular frame for a gauge which by equipping it with pneumatic, electric, electronic or mechanical feelers at the points of measurement, could serve as pneumatic, electric, electronic or mechanical instrument for precision measurements of large external dimensions.

It is a further object of my invention to provide the necessary tool for precise measurement of large dimensions and thus overcome the present limitations imposed by the International System of Fits and Tolerances elaborated by the specialized Commission of the International Standard Organization, which said system excludes the use of tolerance grades lower than the seventh, in dimensions larger than 500 mm., since the presently available measuring techniques, do not permit achieving accuracies higher than the grade 7 for those larger dimensions.

Still another object of my invention is to provide the thermally independent bases for large machine tools for high precision machining (jig borers, etc.) where, by incorporating one or more devices which are the main object of my invention into the design of said machine tools, the really constant basic points completely independent of the temperature will be achieved in these machine tools.

To the ends and objects just mentioned my invention consists of certain devices, combination of parts and materials of which they are made, and features of construction, all of which will be hereinafter described and particularly pointed out in the concluding claims.

In the drawings forming part of this specification,

BASIC CONCEPT OF THE INVENTION

The basic concept of my invention is described below and shown in FIG. 1. For simplifying the presentation of my invention, the explanation will be based on the two dimensional semi-circular frame for a 1000 mm. micrometer.

The selection of a 1000 mm. micrometer frame for the description of my invention does not limit in any way the scope of application of my invention for any other size.

Figure 1:
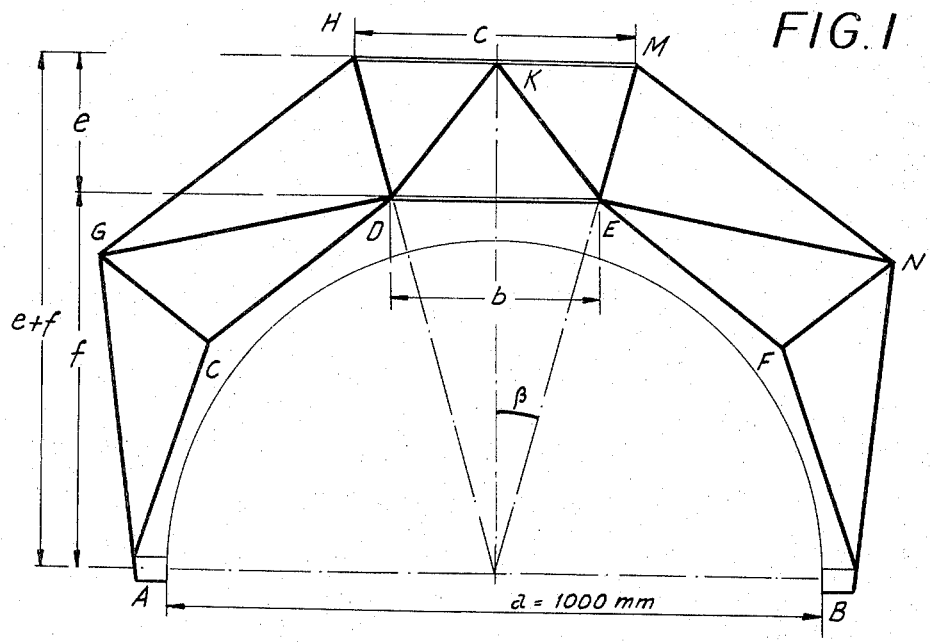
FIG. 1 is a diagrammatic view illustrating the principles involved in the invention.

In FIG. 1 the two dimensional frame is presented consisting of a number of straight struts connected together at several junctions marked.

A, C, D, E, F, B, N, M, K, H, G

The measured distance $a=1000$ mm. (in this presented example) is defined between the points A and B where suitable micrometric screws or other feelers are mounted in order to check precisely the said measured distance $a$.

If all the struts of the frame shown on FIG. 1 were made of the same material (having the same thermal expansion coefficient as steel for example) the distance $a$ which is the measured distance would be influenced by the changes of temperature and this will adversely affect the accuracy of measurement. The increase of distance $a$ will be the function of coefficient of thermal expansion of the material used and the temperature rise.

In the presented invention the component HKM of the frame is made of other material (brass for example) the thermal expansion coefficient of which is higher than the material of the rest of the components of the said frame.

Now in the case of temperature rise the component HKM which is now made of brass will elongate more than it would if it were made of steel. This additional (increased) elongation of component HKM will "close" the whole frame and thus decrease the distance $a$ between the points A and B of the frame.

By proper selection of dimensions of particular struts of the frame as the function of thermal expansion coefficients of those two materials (steel and brass in the presented example) and the measured distance $a$ between the points A and B of the frame it is possible to achieve the situation where the change of $a$ caused by the thermal elongation of the whole frame will be equal and opposite to the change of $a$ caused by the "closing" action of component HKM.

If this condition is fulfilled the distance $a$ remains constant independently of the temperature conditions.

In FIG. 1 the junctions of the frame are marked by letters A, C, D, E, F, B, N, M, K, H, G and some basic distances between them by the letters $a, b, c, e, f$.

For the convenience of the design procedure it is possible to express the dimensional relations of distances "$a, b, c, e, f$," as the function of angle $\beta$ for a given shape of the frame.

It is also evident from FIG. 1 that the precise sizes of struts such as AC, AG, GC, GD, CD, GH and the symmetry thereof is not important for the correct operation of the frame as long as the previous conditions are fulfilled.

In other words only the location of junctions

AHKMBED is important and the location of junctions GCFN may be selected arbitrarily.

The same result of the dimension $a$ completely independent of the temperature conditions may be achieved not only in the way presented above but also in one of the other ways presented below, of which each of them makes an integral part of my invention.

All these alternatives, including the basic one just described, are based on the same FIG. 1 and are listed below.

Alternative No. 1 (basic)

The whole frame is made of one material having a lower thermal expansion coefficient (steel for example) except the component $c$ (between the junctions H and M) which is made of material having a higher thermal expansion coefficient (brass for example) than the rest of the frame.

Alternative No. 2

The whole frame is made of one material, having a higher thermal expansion coefficient (brass for example) except the component $b$ (between the junctions D and E) which is made of the material having a lower thermal expansion coefficient (steel for example) as the rest of the frame.

Alternative No. 3

The whole frame is made of one material (steel for example) except the component $b$ (between junctions D and E) and the component $c$ (between junctions H and M). The component $c$ is made of material having a higher thermal expansion coefficient (brass for axample) than the rest of the frame and the component $b$ is made of the material having a lower thermal expansion coefficient than the rest of the frame (Invar for example).

In all these alternatives the reason for the presence of junction K is to assure the multitriangular construction of the whole frame. If, for example, the junction K were not present, the part of the frame signed HMDE would not be rigid as in the case of multitriangular design presented.

DESIGN

Having presented the objects of my invention and the basic features which are considered characteristic for the invention, I present therefore the design of the compensated gauge for external dimensions.

For the simplicity of explanation the design presented is the most simple which may be built, yet including all features of my invention.

Figure 2:
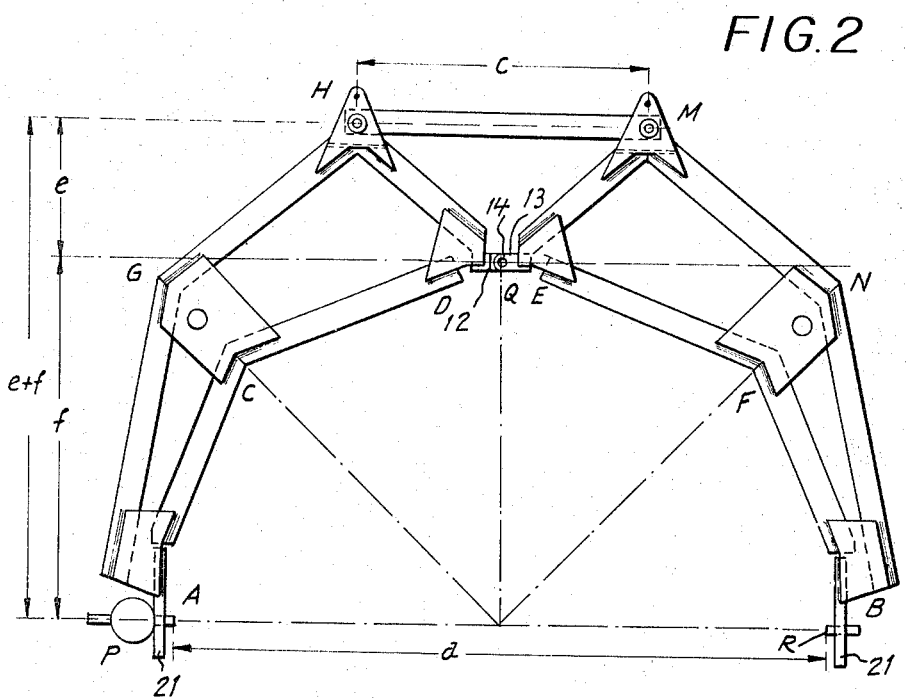
FIG. 2 is an elevational view showing one embodiment thereof.

The design shown on FIG. 2 represents the semicircular micrometer frame for the nominal size $a=1000$ mm. The frame consists of two nearly identical subframes ACDHGA and BFEMNB which are symmetrically assembled together, the connecting rod HM and bearing connection DQE between the subframes. The subframes are made of 1" steel tubes welded to small junction plates made of steel sheet ⅛" thick. In such a way after the welding is done, all the subframes junctions are rigid.

The two subframes are connected to each other and to the connecting rod in three junction points which are H, M and Q. All these junctions are free to rotate round their axes. At points A and B of the frame there are two base-plates where the indicator P and steady anvil R are mounted; their feeling points represent the measured nominal distance $a=1000$ mm.

The component of both subframes as tubes, junction plates, basic plates (at points A and B) and connection bearing body Q are all made of steel and as a result they all have the same coefficient of thermal expansion. The connecting rod HM is made of brass. So all the frame is designed accordingly to the Alternative No. 1 (basic) described in the previous part of this patent specification.

In the case of temperature rise the whole frame will expand proportionally but the connecting rod HM which is made of brass will expand more than if it were made of steel and will "close" the points A and B of the frame together. Thus the thermal "expansion" of the distance $a$ between the feelers points A and B will be fully compensated by the closing action caused by the higher expansion of the rod HM.

For the correct operation of the presented frame, being the basic feature of the compensated gauge for external dimensions, some design dimensions only are basic and important. All the other dimensions may be arbitrarily chosen while designing and this rule corresponds for the two-dimensional frames as well as for the three dimensional ones.

The above mentioned basic dimensions for the frame presented on the FIG. 2 made all of steel and having the connecting rod HM made of brass and designed for the basic measured dimension:

$a=1000$ mm.
$e=210$ mm., $f=550$ mm., $c=436.2$ mm.

are:

In FIG. 1:

(1) Dimension $e=210$ mm. as a distance from the point Q to the line passing through the centers of junctions H and M.
(2) Dimension $f=550$ mm. as a distance from the point Q to the line passing through the measuring points A and B.
(3) Dimension $c=436.2$ mm. as a distance between centers of junctions H and M.

Obviously the lines HM and AB should be parallel.

Figure 3:
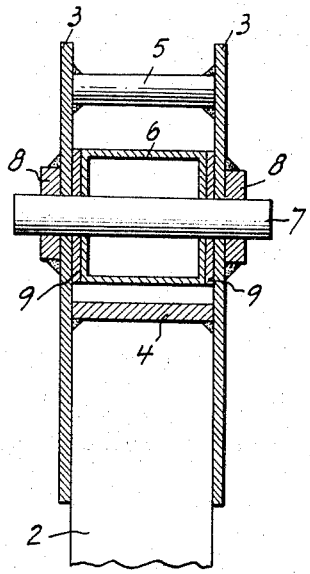
FIGS. 3 and 3A are fragmentary cross-sectional and side elevational views, respectively, of details thereof.
Figure 3A:
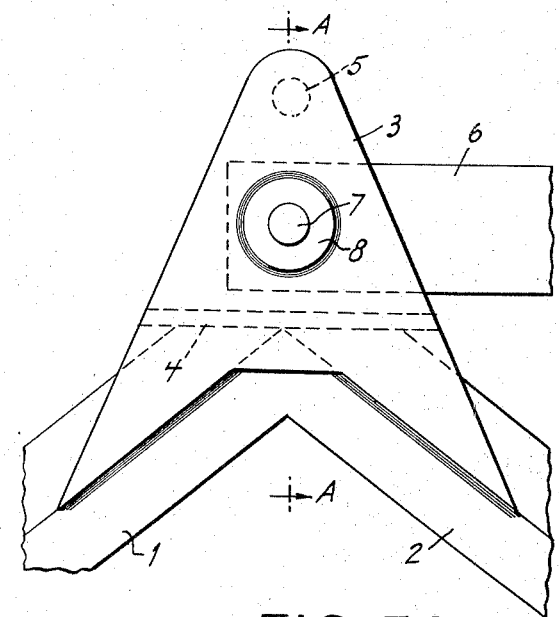
Figure 4:
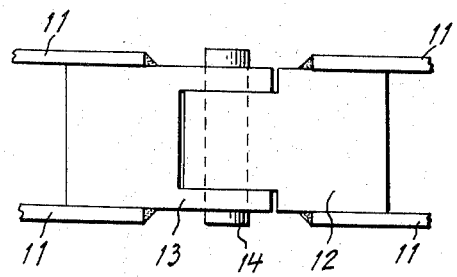
FIGS. 4 and 4A are fragmentary top plan and side elevational views, respectively, of details thereof.
Figure 4A:
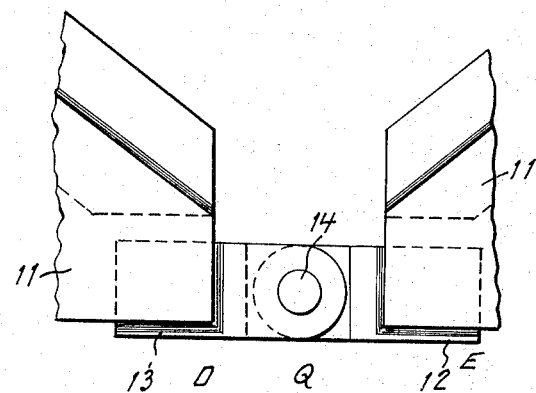

In FIGS. 3 and 4 some further details of this design are presented.

In FIG. 3 the junction H is shown. The 1" steel tube 1 connects the junction H to junction G and 1" steel tube 2 connects the junction H to junction D. The tubes are welded together and the junction frame which consists of two front plates 3 and of distance plate 4 which are welded together. In the upper part of the junction frame there is a strut 5 welded to it. This strut 5 may serve as a lifting device clamping point in the case where the whole frame will not be hand operated but due to its weight and size will be supported by the lifting device.

The connecting rod 6 made of a square hollow brass tube will be connected to the junction frame by round pin axis 7. In order to improve the strength of connection of the pin 7 to the connecting rod 6 and to the plates 3, the additional steel bushings 8 will be welded to the plates 3 and additional brass plates 9 will be brazed to the connecting rod 6. The final assembly will be realized by the fit between the pin 7 and the plates 8.

In FIG. 4 the details of the connection DQE are shown. There junction Q connects directly the two subframes which end here by their four junction plates 11 to which the four steel tubes are welded as can be seen on FIG. 2. At the lower corners of these plates two bearing bodies are welded, the inner bearing body 12 and the outer bearing body 13. These two bodies are connected by the pin-axis 14 which has a slide-fit with the body 13 and a press-fit with the body 12.

The designs of the junctions A and B are self explanatory from the FIG. 2. The diameters of holes in the base plates 21 will be selected accordingly to the dimensions of indicators P and its anvil R.

After the final assembly is done the whole instrument should be zeroed in the measurement laboratory which has the facilities necessary for the inspection of length.

I claim:

1. A compensated gauge for external dimensions comprising a pair of laterally spaced apart arches, one end of said arches being linked together across said space by a link, said end being also pivoted together at a point spaced from said link, said arches forming substantially a semi-circle, the other end of said arches defining a line constituting the dimension to be gauged, said arches being relatively about said pivot point, said pivot point being intermediate said linkage and said line, said gauge being symmetrical with respect to a straight line from the center of said linkage through said pivot point to the midpoint of said line, the coefficients of thermal expansion of said arches and said link being different, the change in length of said line due to thermal changes in said arches being equal and opposite to the change in length of said line due to thermal changes in said link.

2. A compensated gauge according to claim 1 in which the coefficient of said link is greater than that of said arches.

3. A compensated gauge according to claim 1 in which the link is of a brass and the arches of a steel.

4. A compensated gauge according to claim 1 in which the link is parallel to said line.

5. A compensated gauge according to claim 1 in which each of said arches is a frame having a downwardly sloping upper member.

6. A compensated gauge according to claim 5 in which the upper ends of said sloping members are connected at said pivot point by said link.

7. A compensated gauge according to claim 6 in which the lower ends of said sloping members are pivotally connected together.

8. A compensated gauge according to claim 6 in which the lower ends of said sloping members are pivotally connected together and form a triangle with said link.

9. A compensated gauge according to claim 5 in which said frame comprises two angular members joined together at their lower ends and having said sloping member joining said angular members at their upper ends.

10. A compensated gauge according to claim 1 in which feelers are located at the ends of said line.

11. A compensated gauge for external dimensions comprising a pair of laterally spaced apart arches, one end of said arches being rigidly linked together across said space by first and second links, said arches forming substantially a semi-circle, the other end of said arches defining a line constituting the dimension to be gauged, said links and said line being mutually parallel, and coplanar, said second link being intermediate said first link and said line, said gauge being symmetrical with respect to a straight line through the midpoints of said links and said line, the coefficient of thermal expansion of said second link being lower than that of the rest of the gauge, the change in length of said line due to thermal changes in said arches being equal and opposite to the change in length of said line due to thermal changes in said second link.

12. A compensated gauge according to claim 11 in which the coefficient of thermal expansion of said first link is higher than that of the rest of the gauge.

References Cited by the Examiner

FOREIGN PATENTS 170,211 1/1952 Austria.
1,079,847 4/1960 Germany.

LEONARD FORMAN, *Primary Examiner*

SAMUEL S. MATTHEWS, *Examiner*.